United States Patent [19]
Packer et al.

[11] Patent Number: 4,880,993
[45] Date of Patent: Nov. 14, 1989

[54] BUILDING HEAT AND POWER SYSTEM

[75] Inventors: Julian P. Packer, Cheadle Hulme; Sam Almozaffar, Near Northwich, both of England

[73] Assignee: Combined Power Systems Limited, Manchester, England

[21] Appl. No.: 206,503

[22] Filed: Jun. 14, 1988

[30] Foreign Application Priority Data

Jun. 27, 1987 [GB] United Kingdom ................ 8715131

[51] Int. Cl.$^4$ ............................................. F02D 29/06
[52] U.S. Cl. ...................................................... 290/2
[58] Field of Search ............................ 290/2, 4 R, 4 A

[56] References Cited

U.S. PATENT DOCUMENTS

| | | | |
|---|---|---|---|
| 3,944,837 | 3/1976 | Meyers et al. | 290/2 X |
| 4,275,311 | 6/1981 | Agazzone et al. | 290/2 |
| 4,503,337 | 3/1985 | Häfner et al. | 290/2 X |
| 4,510,756 | 4/1985 | Hise et al. | 290/2 X |
| 4,527,071 | 7/1985 | Ausiello | 290/2 X |
| 4,715,192 | 12/1987 | Katz | 290/2 X |
| 4,752,697 | 6/1988 | Lyons et al. | 290/2 |

FOREIGN PATENT DOCUMENTS

| | | |
|---|---|---|
| 0043067 | 1/1982 | European Pat. Off. . |
| 0080764 | 6/1983 | European Pat. Off. . |
| 0143993 | 6/1985 | European Pat. Off. . |
| 2550899 | 5/1977 | Fed. Rep. of Germany . |
| 2707196 | 8/1978 | Fed. Rep. of Germany . |
| 2723144 | 12/1978 | Fed. Rep. of Germany . |
| 3222213 | 12/1983 | Fed. Rep. of Germany . |

Primary Examiner—A. D. Pellinen
Assistant Examiner—W. E. Duncanson, Jr.
Attorney, Agent, or Firm—Charles E. Baxley

[57] ABSTRACT

There is disclosed a combined heat and power system for a building having a heat demand comprising
a primer mover
an electrical generator, adapted to provide building power, the said prime mover being drivingly connected thereto
a heat recovery arrangement
said heat recovery arrangement being connected to the prime mover and recovering heat therefrom, and adapted to provide building heating, and
a control arrangement adapted automatically to control the prime mover in response to said heating demand.

27 Claims, 1 Drawing Sheet

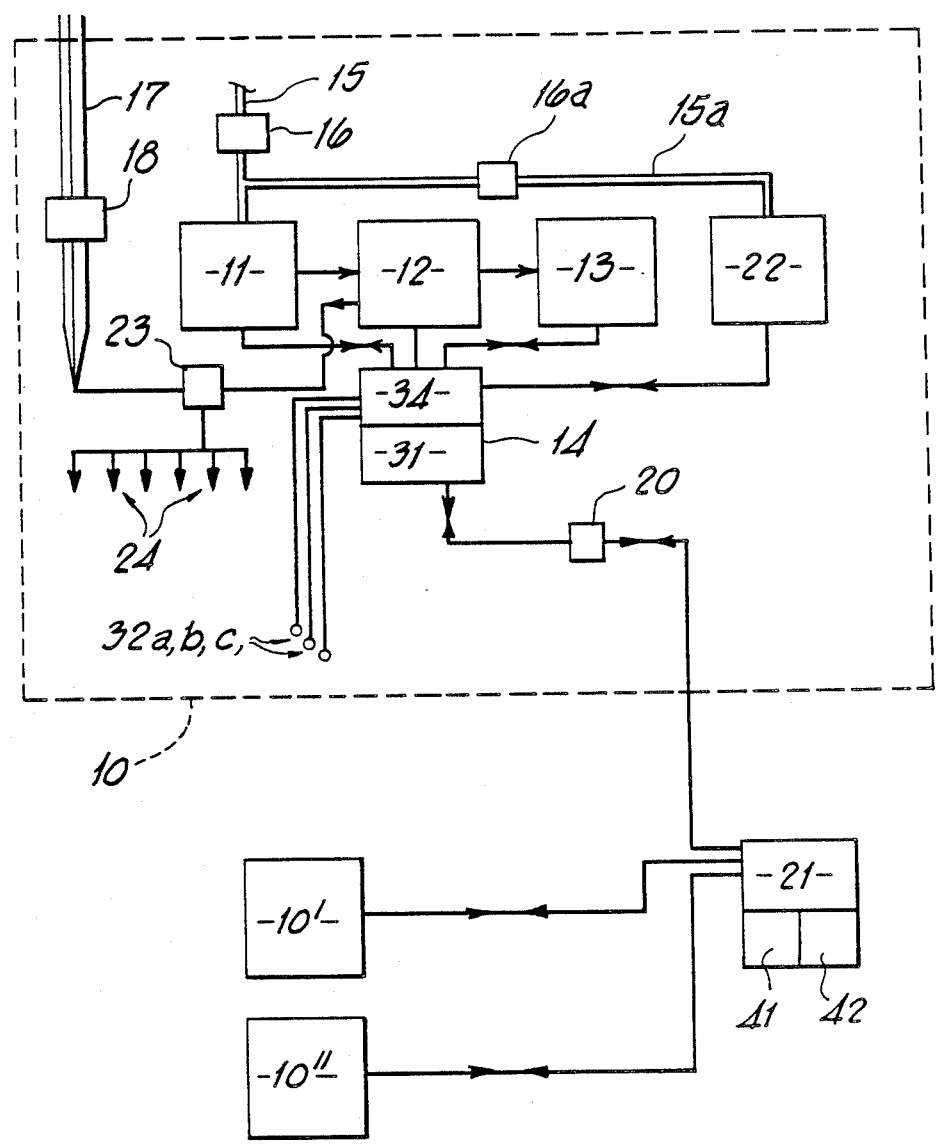

BUILDING HEAT AND POWER SYSTEM

BACKGROUND OF THE INVENTION

This invention relates to combined heat and power systems for buildings.

Such systems comprise a prime mover such as a natural gas-powered internal combustion engine driving an electrical generator and a heat recovery unit recovering waste heat from the engine exhaust and cooling system and possibly the generator and applying such heat to building heating. The generator is used in parallel with external e.g. mains supply to power electrical equipment in the building. The objective of such systems is heating fuel/electricity cost savings on the assumption that even though not all of the fuel consumed by the system is applied directly to building heating, such heat as is not so applied is applied instead to the generation of electricity which is consumed in the building in performing useful tasks and such consumption generally speaking generates heat so that the fuel heats the building indirectly. The heat may be generated deliberately, as by radiant electric heaters or fan heaters, or it may be generated by incandescent lighting or as an unavoidable by-product, as it were, of the consumption of electric power in for example electric motors or electronic equipment, or simply as transmission losses in the building's wiring. At least to some extent, therefore, the electricity produced can be regarded as free, although the capital cost of the generating plant as well as the running and maintenance costs have to be reckoned with. Account has to be taken, also, of the heating effect of the electricity consumed in a normal building in the absence of a combined heat and power system, which must reduce the amount of fuel needed to be consumed for heating the building.

Nevertheless, substantial advantages and cost savings could accrue from building combined heat and power systems, although for various reasons such systems proposed hitherto have not in general been attractive enough to justify the trouble and expense of installation and operation.

The present invention provides improved combined heat and power systems for buildings which can have substantially improved performance, ease of operation and lower installation and running costs than existing proposed systems.

SUMMARY OF THE INVENTION

The invention comprises a combined heat and power system for a building comprising a prime mover drivingly connected to an electrical generator adapted to provide building electrical power and a heat recovery arrangement connected to the prime mover recovering heat therefrom and adapted to provide building heating, and comprising a control arrangement adapted automatically to control the prime mover in response to heating and/or electrical power demand.

The generator may be adapted to be synchronised to an external a.c. electrical power supply.

The control arrangement may be adapted automatically to shut down and re-start the prime mover and reconnect the generator to power the building.

The control arrangement may be adapted automatically to control and/or shut down the prime mover in the event building heat demand falls below a predetermined level.

The prime mover may be adapted automatically to shut down the prime mover in the event of abnormal operating conditions.

The system may be adapted to provide stand-by power in the event of external power supply interruption by the control arrangement's detecting such condition and automatically starting up the prime mover and establishing connection of the generator to power the building.

The system may be adapted to respond independently to building power demand and building heat demand. The system may be be operable to supply up to its maximum rated power output and simultaneously to supply less than the entire heat output associated therewith to building heating.

The system may have connection means to a remote control arrangement adapted to communicate with a plurality of such systems. Said connection means may comprise modem means adapted to connect the system to said remote control arrangement via a telephone link. Said control arrangement may be adapted to control said system according to rules which can be changed by signals from the remote control arrangement. Said control arrangement may be adapted to supply to said remote control arrangement information about the system.

Said control arrangement may be adapted to monitor the condition of elements of the system, such, for example, as lubricating oil condition and spark plug condition, where the prime mover relies on such elements.

Said control arrangement may also be adapted to monitor operating variables of the system, such, for example, as temperatures of the system, such as water temperatures associated with building heating and prime mover exhaust system temperature, and flow rates of fluids used in the system, such as fuel flow rate and flow rates of water used to circulate building heat.

Said control arrangement may also be adapted to monitor electrical power output by monitoring e.g. power factor, phase voltage and current and frequency.

Said control arrangement may be adapted to monitor the status of electrical control circuits of the system.

All or any of such monitoring may be effected on-site, but said control arrangement may also be adapted to effect such monitoring by communication with external processing means.

Said control arrangement may provide engine governing an mains synchronisation for said prime mover/generator arrangement.

Said control arrangement may incorporate an intelligent knowledge based system scheduling maintenance operations and predicting system or component failure.

The invention also comprises a system as above described in a building in association with at least one other heat generator so arranged and controlled that the heat recovery arrangement is the priority heat generator for the building.

The invention also comprises a network comprising a plurality of systems as above described connected to a common remote control arrangement receiving information from said systems and effecting control over said systems and including a heuristic arrangement adapted to increase total efficiency of said systems by adapting control algorithms according to operating information supplied to said remote control arrangement from said systems.

BRIEF DESCRIPTION OF THE DRAWINGS

Embodiments of combined building heat and power systems according to the invention will now be described with reference to the accompanying drawings, in which the single figure is a diagrammatic illustration of one embodiment.

DETAILED DISCLOSURE OF THE PREFERRED EMBODIMENT

The figure illustrates a combined heat and power system 10 for a building comprising a prime mover 11—a gas engine driven from natural or town or propane or other gas—drivingly connected to an electrical generator 12 adapted to provide building electrical power and a heat recovery arrangement 13 connected to the engine 11 recovering heat therefrom and adapted to provide building heating, and comprising a control arrangement 14 adapted automatically to control the engine 11 in response to heating demand.

The gas—from mains supply pipe 15 via the usual meter 16—would ordinarily be used to heat water, for building heat circulation through radiators, in a conventional boiler. Instead, in the combined heat and power system, the gas is burned in the engine 11 and produces useful electricity in the generator 12, the hot exhaust gas and cooling water from the engine 11 being used to heat circulatory water in the heat recovery arrangement 13.

A typical system would produce up to 40 KW of 3-phase electricity and around 75 KW of high grade hot water at an outlet temperature from the heat recovery arrangement of up to 85° C., depending on the incoming water temperature and flow rate. The use of a condensing heat exchanger, depending on the availability of a suitable low temperature water supply, could increase heat recovery by some 5–10 KW.

The generator 12 is self-exciting, so that it is not dependent on mains electricity supply for re-starting, but is adapted to be synchronised with the 3-phase mains supply 17, which has the usual meter 18. Ordinarily, the mains supply 17 would be the sole source of electrical power for the building, although stand-by generators are often provided, which cut in or which can be manually started in the event of an interruption in the mains supply. However, with a combined heat and power system, the mains supply 17 is supplemented or replaced by the generator 12 of the system, replacing expensive power station-generated electricity with electricity generated less expensively on-site.

Clearly, instead of generating 3-phase current, single phase may be generated if this is what will be used in the building; and, of course, the choice of voltage and frequency will be made according to the available mains supply, or otherwise, as required.

The control arrangement 14 is adapted automatically to shut down and re-start the engine 11 and reconnect the generator 12 to power the building. The engine 11 can be progressively shut down automatically in the event building heat demand falls below a predetermined level (unless, of course, the system is being relied upon to replace mains power). The engine 11 can also be shut down automatically in the event of abnormal operating conditions—mains failure could of course be such a condition unless the system is operating as a stand-by generator, in which case the control arrangement detects a mains interruption and automatically starts up the engine 11 and establishes connection of the generator 12 to power the building. This will take place in these circumstances even though the bulding may not be calling for heat—the exhaust heat can then, however, be vented to atmosphere.

The system can also be adapted to respond more generally independently to building power demand and heat demand—thus, for example, in times of high heat demand but low power demand such for example as the heating up of the building before the start of a working week most of the energy could be output as heat energy by, for instance, connecting the generator output to a resistive load in the building heating water circuit.

The system has connection means in the form of a modem 19 adapted to connect the system via a telephone link 20 to a remote control arrangement 21 adapted to communicate with a plurality of such systems. The control arrangement 14 is adapted to control the system according to rules—normally embodied in a program for a computer of the control arrangement—which can be changed by signals from the remote control arrangement 21. The control arrangement 14 is adapted to supply to the remote control arrangement 21 information about the system.

Thus for example the control arrangement 14 can supply data about building heating water temperatures and flow rates, heating demands and power demands. Other systems in a network with a common remote control arrangement 21 can supply similar information. From the totality of this information input to the remote control arrangement 21 can be evaluated improved control algorithms such for example as for desired operating power levels at different heating loads and power loads to optimise efficiency.

Very importantly, the local or on-site control arrangement 14 is adapted to monitor the condition of elements of the system such as lubricating oil condition, for wear and debris monitoring as well as for deciding when to change the oil, spark plug condition, bearing and exhaust temperatures and so on. From such data can be deduced the mechanical and thermal "health" of the system, and probabilities of failure of components and sub-systems can be assessed and the assessments improved by taking into account the combined experience of a network of systems by this data being reported to and analysed by a computer in the remote control arrangement 21. This will help to avoid any foreseeable failure and so keeps the system operating at best achievable efficiency for all the time for which it is called upon to operate.

The electrical output of the generator is also monitored as to its power factor, phase voltage and current, and frequency. Gas consumption is also monitored. Programs in computers in the control arrangement 14 and the remote control arrangements 21 can evaluate the cost of generating the electricity and heating the building, and effect comparison with the costs of doing those things conventionally.

Another control arrangement function is engine governing and mains synchronisation.

The control arrangements 14 and 21 also incorporate an intelligent knowledge based system scheduling maintenance operation and predicting system or component failure.

The control arrangements 14 and 21 will be described in more detail below.

The system is, as illustrated, installed in a building with other heat generator means 22 to provide heat additional to that provided by the system. The system, however, is regarded as the "priority boiler" for the building (unless overridden) so that whenever heat is required electricity is generated at the same time. The other heat generator means 22 are also connected to the control arrangement 14 so as to be operated in conjunction with the combined heat and power system. As illustrated in FIG. 1, the other heating means 22 are supplied with gas through a supply pipe 15a with a separate meter 16a. Both the heat recovery arrangement 12 and the heat generator means 22 can supply heat to the same heat distribution system such, for example, as a hot water circulating system to heat the building.

The generator 12 supplies electrical power via a meter 23, also connected to the mains supply, to the electrical distribution system 24 of the building.

The control arrangement 14 illustrated in FIG. 3 comprises a microcomputer 31 based on, for example, the 16 bit 68000 series. The control system is contained in EPROM and the data in non-volatile RAM.

Sensors 32a, b, c etc are connected to the microcomputer 31 through a suitable interface unit 34 which scans and processes signals from the sensors and outputs to the computer digital signals representative of the sensor signals.

The sensors 32a, b, c etc sense the following variables:
exhaust gas temperature
cooling water temperature
oil temperature
enclosure temperature
gas flow rate
oil condition (e.g. solids content, pH)
oil consumption/sump level
electrical power output, voltage, current
frequency
power factor
phase condition
exhaust gas oxygen content
presence/absence of mains electicity supply
spark plug condition From this information, the microcomputer is programmed, in ways which will be well understood by those familiar with the art of computer control, to calculate:
heat output of the heat recovery unit
specific fuel consumption (a measure of engine efficiency)
instantaneous and average energy efficiency and cost saving The variables are stored in the memory of the microcomputer for as long as may be necessary for operation of the system and computation of the various outputs and efficiencies, and passed on to the remote control arrangement 21 or dumped to a long term store or print-out for permanent record-keeping.

The microcomputer is also supplied with engine speed information, either directly via a tachometer or from the frequency sensor and is programmed to govern the engine to control generator frequency either to the mains frequency to a preselected frequency for stand-alone operation. By comparing phase and frequency information for the mains and for the generator 12, the computer can adjust the engine 11 to synchronise the generator output with the mains supply for parallel operation.

The computer 31 also evaluates power demand (e.g. from voltage and power factor etc information) and controls, again in ways the computer control expert will readily appreciate, the engine 11 to match power output with demand by restoring sensed voltage and power factor to nominal levels. The computer 31 also controls the engine 11 start-up by outputting control signals to appropriate control devices.

Should any of the sensed variables exceed predetermined safety limits, the computer 31 is programmed to trip the unit out.

In the event of a shut down of the system in response to a safety trip, the programming causes the computer to review all of the variables and, if within limits (e.g. after some temporary abnormal condition) to attempt automatic restart and reconnection to the power distribution arrangement, resynchronising, if necessary, with mains supply. This automatic reconnection may be attempted a prescribed number of times (depending on the reason for the shut down). If reconnection is not achieved, the control arrangement 14 abandons further attempts and passes a message to the remote control arrangement 21.

With more powerful programming and greater computational and analystical capacity the control arrangement 21 is able to devise some corrective action and instruct the arrangement 14 to attempt further reconnections using a modified start-up routine, or an alert can be given to repair or maintenance crew to repair any fault diagnosed or attempt manual reconnection or on-site investigation.

Performance data can be logged and analysed in the control arrangement 14 and 21 or either of them.

A computer 41 in the control arrangement 21 can house an expert system which has access to all stored data from the local control arrangements 14 of a plurality of and the control arrangement 21 can house a data base 42 for this purpose the information in the data base 42 being continually updated by the computer 41 with incoming information from the combined heat and power system 10 and others 10', 10" etc connected to the control arrangement 21. This expert system can be used to assess likelihood of component failure (from initial data, which can be modified by data derived from actual performance of the components in the system) and thus direct preventative maintenance. The expert system can also schedule servicing of the head and power systems on the basis of utilisation—it will know, for example, the running times, oil conditions and so on of each location and plan oil changes and other servicing functions accordingly.

The expert system can also provide information on the technical and commercial performance of the heat and power systems.

Heuristic programming enables the control arrangement 21 to develop new rules or algorithms and models and modify existing rules and models to deal with component failure, improve efficiency and so on. Mains electricity and fuel prices may also be fed in and used to compute the most cost-efficient utilisation of these energy sources. Different electricity tariffs may be input so that for example cheap night-time electricity can be used to best effect.

Whilst gas fuels have been described particularly, it will be understood that any other fuel such as oil, coal, wood, peat and so on may be used instead.

We claim:

1. A combined space heat and electrical power producing system for a building and comprising in combination:
a prime mover, an electrical generator connected to be driven by the prime mover and adapted to provide the electrical power to the building, heat recovery means in heat exchange relationship with the prime mover to recover waste heat therefrom and adapted to provide the space heat to the building, a control arrangement adapted automatically to control the prime mover, the control arrangement including an intelligent knowledge-based system scheduling maintenance operations and predicting failures of components and of the system.

2. A combined space heat and electrical power producing network for a building comprising in combination:

a prime mover, an electrical generator connected to be driven by the prime mover and adapted to provide the electrical power to the building, heat recovery means in heat exchange relationship with the prime mover to recover waste heat therefrom and adapted to provide the space heat to the building, a remote control arrangement connected to the prime over and to the generator and to the recovery means and adapted automatically to control same, the remote control arrangement receiving operating information from same and effecting control over same and including a heuristic arrangement adapted to increase total efficiency of same by adapting control algorithms according to the operating information.

3. The system according to claim 2 further characterized in that it is adapted to respond independently to demand for electrical power and demand for the space heat.

4. The system according to claim 3, further characterized in that it is operable to supply up to a maximum rated electrical power output and simultanously to supply less than an entire heat output associated therewith to the space heat.

5. The system according to claim 4 further characterized by connection means comprising a modem adapted to connect the system to said remote control arrangement via a telephone link.

6. The system according to claim 4 further characterized in that said remote control arrangement is adapted to control said system according to rules which can be changed by signals by the remote control arrangement.

7. The system according to claim 6 further characterized in that said system is adapted to supply two said remote control arrangement information about the system.

8. The system according to claim 2 further characterized in that said system is adapted to monitor conditions of elements of the system.

9. The system according to claim 8 further characterized in that said remote control arrangement is adapted to monitor lubricating oil conditions.

10. The system according to claim 8 further characterized in that said remote control arrangement is adapted to monitor spark plug conditions.

11. The system according to claim 8 further characterized in that said remote control arrangement is adapted to effect such monitoring on-site.

12. The system according to claim claim 8 further characterized in that said remote control arrangement is adapted to effect such monitoring by communication with external processing means.

13. The system according to claim 2 further characterized in that said remote control arrangement is adapted to monitor operating variables of the system.

14. The system according to claim 13 further characterized in that said remote control arrangement is adapted to monitor temperatures of the system.

15. The system according to claim 14 further characterized in that said remote control arrangement is adapted to monitor water temperatures associated with the space heat.

16. The system according to claim 14 further characterized in that said remote control arrangement is adapted to monitor exhaust system temperature of the prime mover.

17. The system according to claim 13 further characterized in that said remote control arrangement is adapted to monitor flow rates of fluids in the system.

18. The system according to claim 17 further characterized in that said remote control arrangement is adapted to monitor fuel flow rate.

19. The system according to claim 17 further characterized in that said remote control arrangement is adapted to monitor flow rates of water used to circulate the space heat.

20. The system according to claim 13 further characterized in that said remote control arrangement is adapted to monitor electrical output of the system.

21. The system according to claim 20 further characterized in that said remote control arrangement is adapted to monitor electrical power output.

22. The system according to claim 20 further characterized in that said remote control arrangement is adapted to monitor power factor.

23. The system according to claim 20 further characterized in that said remote control arrangement is adapted to monitor phase voltage and current.

24. The system according to claim 20 further characterized in that said remote control arrangement is adapted to monitor frequency.

25. The system according to claim 2 further characterized in that said remote control arrangement is adapted to monitor status of electrical control circuits of the system.

26. The system according to claim 2 further characterized in that said remote control arrangement provides engine governing and mains synchronization for said prime mover and generator.

27. The system according to claim 2 further characterized in that it is in association with at least one other heat generator so arranged and controlled that the heat recovery means is priority heat generator for the building.

* * * * *